United States Patent
Zaki

(10) Patent No.: US 9,796,278 B2
(45) Date of Patent: Oct. 24, 2017

(54) METHOD FOR OPERATING A CHARGING DEVICE FOR SINGLE-PHASE AND MULTI-PHASE CHARGING OF AN ENERGY STORE IN A MOTOR VEHICLE AND CHARGING DEVICE

(71) Applicant: AUDI AG, Ingolstadt (DE)

(72) Inventor: Sami Robert Zaki, Abensberg (DE)

(73) Assignee: AUDI AG, Ingolstadt (DE)

( * ) Notice: Subject to any disclaimer, the term of this patent is extended or adjusted under 35 U.S.C. 154(b) by 128 days.

(21) Appl. No.: 14/890,076

(22) PCT Filed: Apr. 25, 2014

(86) PCT No.: PCT/EP2014/001114
§ 371 (c)(1),
(2) Date: Nov. 9, 2015

(87) PCT Pub. No.: WO2014/180539
PCT Pub. Date: Nov. 13, 2014

(65) Prior Publication Data
US 2016/0121740 A1 May 5, 2016

(30) Foreign Application Priority Data

May 10, 2013 (DE) ........................ 10 2013 007 971

(51) Int. Cl.
*H02J 7/00* (2006.01)
*B60L 11/18* (2006.01)
(Continued)

(52) U.S. Cl.
CPC ....... *B60L 11/1811* (2013.01); *B60L 11/1812* (2013.01); *B60L 11/1816* (2013.01);
(Continued)

(58) Field of Classification Search
USPC ........................................ 320/108, 109, 125
See application file for complete search history.

(56) References Cited

U.S. PATENT DOCUMENTS 4,384,321 A * 5/1983 Rippel ................ H02M 1/4225
320/DIG. 31
4,451,773 A * 5/1984 Papathomas .............. H02J 1/10
307/48

(Continued)

FOREIGN PATENT DOCUMENTS

| DE | 10 2009 060 364 | 6/2011 |
| EP | 0 886 904 | 8/2004 |
| EP | 2 362 522 | 8/2011 |
| WO | WO 2010/091743 | 8/2010 |
| WO | WO 2012/128626 | 9/2012 |

OTHER PUBLICATIONS

International Search Report issued by the European Patent Office in International Application PCT/EP2014/001114.

*Primary Examiner* — Brian Ngo
(74) *Attorney, Agent, or Firm* — Henry M. Feiereisen LLC

(57) ABSTRACT

A method for operating a charging device of an electrical energy store for a motor vehicle, wherein a dedicated rectifier device for generating a charging voltage for the electrical energy store is associated with each phase of an AC power supply, includes determining for each rectifier device a usage variable descriptive of its prior usage for charging the electrical energy store; when performing a multi-phase charging operation with the charging device, using for each phase a corresponding rectifier device for generating the charging voltage for the electrical energy store; and when performing a single-phase charging operation with the charging device, using the hitherto most underused rectifier device for generating the charging voltage for the electrical energy store based on the usage variable.

8 Claims, 1 Drawing Sheet

(51) Int. Cl.
 *H02J 3/26* (2006.01)
 *H02J 7/02* (2016.01)

(52) U.S. Cl.
 CPC ....... *B60L 11/1825* (2013.01); *B60L 11/1838* (2013.01); *B60L 11/1844* (2013.01); *H02J 3/26* (2013.01); *H02J 7/02* (2013.01); *B60L 2210/30* (2013.01); *B60L 2230/12* (2013.01); *Y02E 40/50* (2013.01); *Y02E 60/721* (2013.01); *Y02T 10/7005* (2013.01); *Y02T 10/7088* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y04S 10/126* (2013.01)

(56) References Cited

U.S. PATENT DOCUMENTS

| | | | |
|---|---|---|---|
| 5,604,385 A | 2/1997 | David | |
| 2005/0046387 A1* | 3/2005 | Aker | H02J 7/0042 320/125 |
| 2009/0189456 A1 | 7/2009 | Skutt | |
| 2009/0288896 A1* | 11/2009 | Ichikawa | B60K 6/365 180/65.265 |
| 2012/0217111 A1* | 8/2012 | Boys | H01F 38/14 191/10 |
| 2013/0147264 A1* | 6/2013 | Taddeo | B60L 1/006 307/9.1 |
| 2016/0121740 A1* | 5/2016 | Zaki | B60L 11/1812 320/109 |

\* cited by examiner

METHOD FOR OPERATING A CHARGING DEVICE FOR SINGLE-PHASE AND MULTI-PHASE CHARGING OF AN ENERGY STORE IN A MOTOR VEHICLE AND CHARGING DEVICE

CROSS-REFERENCES TO RELATED APPLICATIONS

This application is the U.S. National Stage of International Application No. PCT/EP2014/001114, filed Apr. 25, 2014, which designated the United States and has been published as International Publication No. WO 2014/180539 and which claims the priority of German Patent Application, Serial No. 10 2013 007 971.3, filed May 10, 2013, pursuant to 35 U.S.C. 119(a)-(d).

BACKGROUND OF THE INVENTION

The invention relates to a method for operating a charging device of an energy store of a motor vehicle, wherein during multi-phase charging with the charging device, a rectifier device is used for each phase for generating a charging voltage for the energy store, whereas during single-phase charging by the charging device only one rectifier device is active. In addition, the invention relates to a charging device for an energy store of a motor vehicle, which has a control device and for each connecting cable associated with a phase a rectifier device for generating a charging voltage for the energy store, wherein a first connecting cable that is connected to a first rectifier device can be used during single-phase charging.

Recently, motor vehicles with an electric energy store providing larger amount of energy have been proposed, wherein the energy of the energy store can be, for example, at least partially converted into driving energy for the motor vehicle, as is known for hybrid and electric vehicles. To be able to charge such electric energy store of a motor vehicle, charging devices are known, whose main task is to convert the electric power provided on at least one connecting cable into a suitable charging voltage for charging the energy store which is a DC voltage. Charging devices have been also known that can be used for multi-phase electrical power, for example a two-phase or three-phase charging. Typically a connecting cable and a rectifier device are associated with every phase.

It is desirable that charging devices suitable for multi-phase charging should also be suitable for single-phase operation, so that users of motor vehicles can recharge the energy store also on a single-phase infrastructure, i.e. can therefore use single-phase electric power. Known prior art charging devices are constructed to use a first connecting cable connected to a first rectifier for single-phase charging. If an applied voltage is detected at the first connecting cable, for example with a suitable voltage measuring device, while no voltage is detected at to the other second connecting cables for the other phases, only the first rectifier device connected to the first connecting cable is operated to perform the charging process.

Because a charging device is designed for a certain service life, the prior art charging devices require for the rectifier devices an increased service life, which results in higher costs for the charging device.

It should also be noted at this point that the term rectifier device does not restrict the device to perform only a rectifier function, but describes modules for the different phases, which in addition to a rectifier may also include other electrical components, for example, filters, especially power factor correction filters and the like. Moreover, a rectifier device as a module may also include a total of several rectifier stages.

SUMMARY OF THE INVENTION

It is therefore the object of the invention to provide a method for operating a charging device and a charging device, which can be realized more cost-effectively due to more homogeneous service life requirements.

To achieve this object, a method of the aforementioned type according to the invention determines a utilization factor describing the prior usage for each rectifier device, wherein for single-phase charging, the hitherto most under-used rectifier device is used for charging.

The utilization factor which is preferable an operating time or work done so far of the rectifier device can be detected by a counter, for example, by an hour meter or a watt-hour meter. If the utilization factor is supplied accordingly, it can be considered and a substantially uniform total usage of rectifier devices over the lifetime of the charging device can be realized depending on the utilization factor. This is achieved by using for a single-phase charging always the least used rectifier device, i.e. the rectifier device with the utilization factor indicating the smallest usage. For this purpose, a controller executing the method of the invention may have a corresponding comparator. Therefore, if the controller recognizes, for example, based on voltage measurements on the connecting cables for the various phases that a voltage is present only on one connecting cable, i.e. single-phase charging is to be performed, evaluates the utilization factors of the rectifier devices and selects the rectifier device having the utilization factor indicating the lowest usage, for example, so the lowest value for operating hours or power, which is then used for the charging process, of course by updating the utilization factors, therefore "counting along". The other rectifier devices remain inactive.

In this way, the usage is uniformly distributed across all rectifier devices (modules), thus obtaining a cost-effective design of the charging device.

It should be noted at this point that it conceivable with the method according to the invention to evaluate the utilization factors during an active charging process and possibly, when another rectifier device has during the charging process a utilization factor that is smaller, to switch to and use this other rectifier device in order to achieve an even better equalization. However, this is less preferred, since then switching operations have to be performed during the single-phase charging process.

According to a concrete embodiment of the invention, a first rectifier device connected with a first connecting cable used for single-phase charging and a switching device can be used for optionally connecting the at least one second rectifier device different from the first rectifier device with the first connecting cable, wherein at the start of each charging process a switch of the switching device connecting the least-used second rectifier device with the connecting cable is closed and the first rectifier device is deactivated. This means that the second rectifier devices can also be connected via switches of the switching device to the first connecting cable that supplies the electric power in single-phase charging. When charging is initially not to be performed with the second rectifier device that is not already connected with the first connecting cable, the corresponding switch can be closed, so that a connection is established to the first connecting cable. The first rectifier device is deactivated accordingly, i.e. switched to inactive, and does not provide power for the energy store. Instead, the function of the first rectifier device is taken over by the second rectifier device switched in via the corresponding switch. The switching device and of the rectifier devices may then also be controlled correspondingly by the control device.

The switch can hereby be implemented especially as a relay or a semiconductor switch. Such switches are known in power electronics and can advantageously also be used in the present method.

It should also be noted at this point that other functions can be integrated into the switch, as is generally known in the art. For example, the switches may include at least one rectifier stage and/or at least one power factor correction filter.

As already indicated, according to another development of the present invention, a voltage measurement is performed on all connecting cables to distinguish between single-phase charging and multi-phase charging. This can be done by using suitable voltage measuring devices on the connecting cables that supply their measured values to the controller which evaluates them accordingly. If a voltage is only detected at the first connecting cable, single-phase charging can be assumed; conversely, when a voltage is detected on all connecting cables, customary multi-phase charging must be performed.

According to another advantageous embodiment of the invention, with a charging device designed for three-phase charging, the two rectifier devices having utilization factors indicating the hitherto lowest usage are used for the charging process with two-phase charging. With a charging device designed for three-phase charging, the method according to the invention, which aims to balance the usage of the rectifier devices should not be limited to single-phase charging, but may be expanded, when an option for two-phase charging exists, wherein corresponding switching devices for in this case two first connecting cables can be implemented.

In addition to the method, the invention also relates to a charging device, wherein a charging device according to the invention, as described in the introduction, is characterized in that the charging device comprises for each rectifier device a counting device for a utilization factor describing its respective previous use, wherein for single-phase charging the control device is designed to use for the charging process the rectifier device that has so far experienced the least use according to the contents of the counting devices. The counting device may, as already indicated, be an operating-hour counter or watt-hour meter for measuring as a utilization factor an operating time or the performed work. All statements regarding the method according to the invention can be analogously transferred to the charging device of the invention, with also provides the aforementioned advantages.

In particular, in practice, a switching device controllable by the control device for optionally connecting with the first connecting cable the respective at least one second rectifier device that does not correspond to the first rectifier device may be provided. The switching device and the rectifier devices, as described, may then be suitably controlled, when a second rectifier device takes over the single-phase charging process, by deactivating the first rectifier device and closing a switch, which is preferably implemented as a relay or as a semiconductor switch, to connect the first connecting cable to the respective second rectifier device.

When the concrete charging process is to be decided based on the voltage measurements of the connecting cables, a voltage measuring device that measures the voltage at the connecting cable and transmits measurement data to the controller may advantageously be associated with each connecting cable. Conventional voltage measuring devices can be used here.

It should be noted at this point that the charging device may be realized wholly or partly in a motor vehicle, i.e. a motor vehicle may therefore include the charging device, in particular completely.

BRIEF DESCRIPTION OF THE DRAWING

Further advantages and details of the present invention will become apparent from the exemplary embodiments described below and from the drawings, which show in.

DETAILED DESCRIPTION OF PREFERRED EMBODIMENTS

Figure 1:
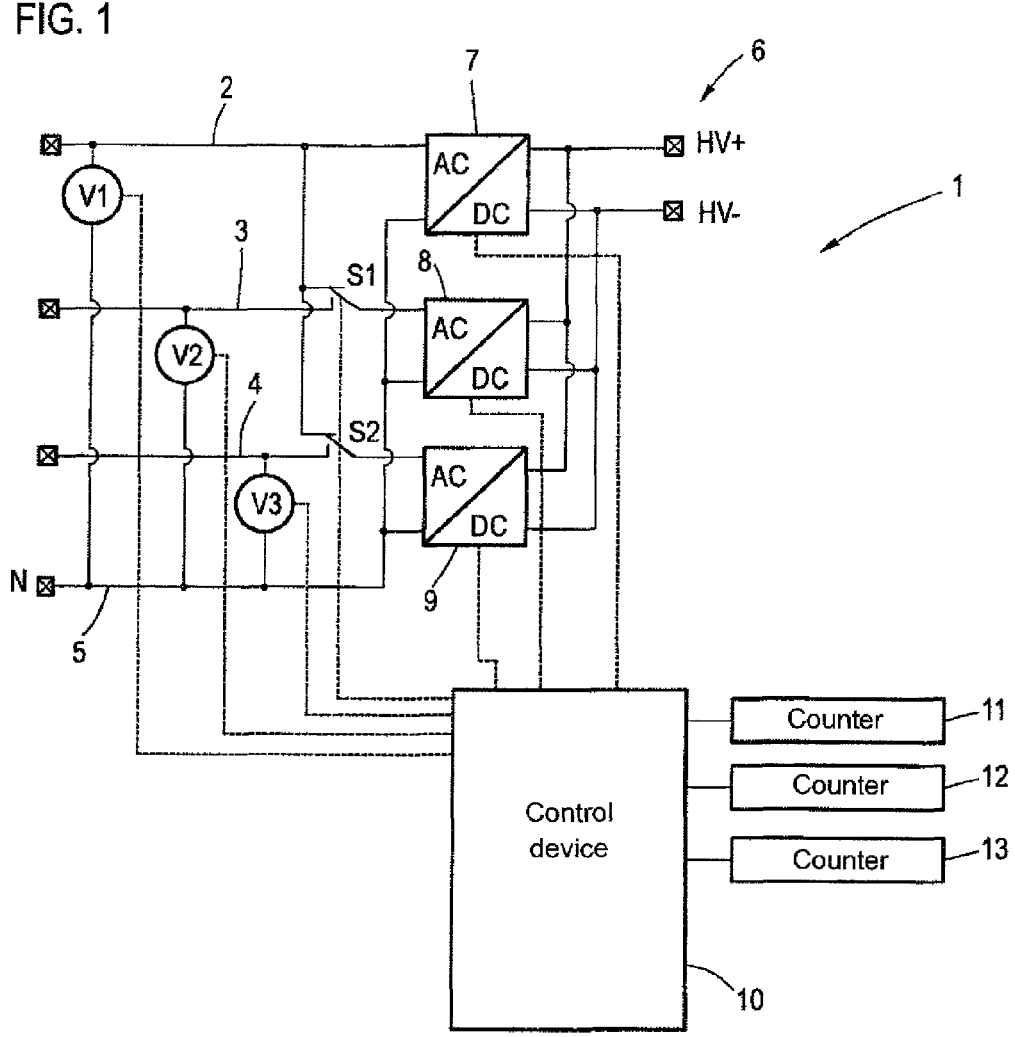
FIG. 1 a charging device according to the invention, and
FIG. 2 a schematic diagram of a motor vehicle.

FIG. 1 shows a schematic functional circuit diagram of a charging device 1 according to the invention. It will be understood that the illustrated components may be disposed in a common housing; however, the modules for the various phases may also be implemented as individual units.

The present charging device 1 is designed for three-phase charging, i.e. means it has three connecting cables 2, 3, 4 for the different phases and a grounded neutral conductor 5. The charging device 1 supplies as output at the terminals 6 a high-voltage DC voltage as a charging voltage for an unillustrated electric energy store of a motor vehicle. To generate the charging voltage from the corresponding AC input voltages, a rectifier device 7, 8, 9 is provided for each phase, which may also comprise, in addition to a rectifier with at least one rectifier stage, other components, for example filters and the like. When the charging device 1 is connected to electric power, i.e. in particular to a power grid, which provides only a single-phase AC voltage, the charging device 1 can still be used for charging the energy store, as will be set forth in more detail below.

When connected to only one phase, the voltage is applied to the first connecting cable 2, which, as shown, is connected directly to the first rectifier device 7. However, a switching device is provided which includes the switches S1 and S2. The respective second rectifier devices 8, 9 can be selectively connected with their associated second connecting cables 3, 4 or with the first connecting cable 2 via the switches S1, S2. In this way, the first connecting cable 2 can also be connected with the second rectifier devices 8, 9 that are not the first rectifier device 7.

In order to detect whether single-phase load or multi-phase, here three-phase, charging is to be performed, voltage measuring devices V1, V2 and V3 are provided that measure the voltages at the respective connecting cables 2, 3, 4. When a voltage is present at the first connecting cable 2, single-phase charging is performed; when a voltage is present at all three connecting cables 2, 3, 4, a three-phase charging is performed. The operation of the charging device 1 is controlled by a control device 10, which is capable of controlling in addition to the rectifier devices 7, 8, 9 also the switches S1 and S2 and also receives data from the voltage measuring devices V1, V2 and V3. The control device 10 is designed to carry out the method according to the invention, for which purpose it also has three associated counting devices 11, 12 and 13. The counting device 11 measures the usage of the first rectifier device 7, the counting device 12 measures the usage of the second rectifier device 8, and the counting device 13 measures the usage of the second rectifier device 9. The counting devices 11, 12, 13 are configured to measure the electric work of the rectifier device 7, 8, 9 (watt-hour meter) or the operating time (operating hours counter).

When the control device 10 determines based on the measurement results of the voltage measuring devices V1, V2 and V3 that single-phase charging is imminent, the utilization factors describing usage of the rectifier devices 7, 8, 9 are recalled in the counting devices 11, 12, 13 and evaluated as to which rectifier device 7, 8, 9 has thus far been used the least, i.e. in particular, which utilization factor is the lowest. If this is the first rectifier device 7, then the switches S1 and S2 is not operated and the rectifier device 7 is activated and used. It this is one of the second rectifier devices 8, 9, then the first rectifier device 7 is deactivated, the corresponding switches S1, S2 are closed, and the respective second rectifier device 8, 9 is activated and used. In this way, usage with the single-phase charging is evenly distributed among the various rectifier devices 7, 8, 9.

The switches S1, S2 are in this case designed as relays, but may also be implemented as semiconductor switches. In principle, more functions, for example, a rectifier stage or a power factor correction filter may be integrated in such switches.

It should also be noted that the concept presented here can of course also be used in two-phase charging with a charging device 1 designed for three-phase charging, wherein the switching device is to be adapted accordingly, as is readily apparent to those skilled in the art.

Figure 2:
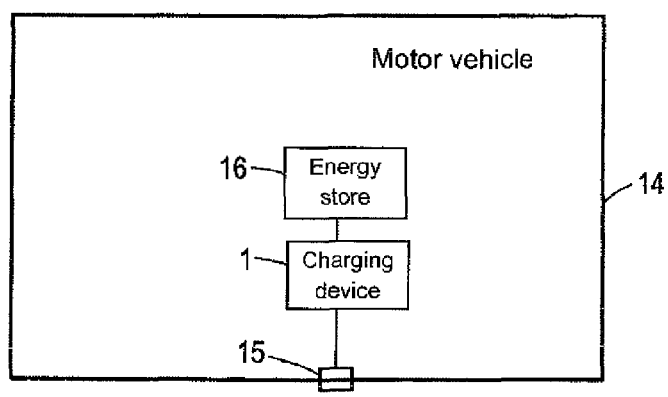

FIG. 2 illustrates schematically a case where the charging device 1 is integrated in a motor vehicle 14, so that the charging device 1 is connected to one side with a high-voltage terminal 15 of the motor vehicle 14, and to the other side with an electrical energy store 16 of the motor vehicle 14, here a high-voltage battery, which is to be loaded by way of the charging device 1. Other embodiments are also conceivable where the charging device 1 is only partially integrated into the motor vehicle 14 or is even realized as an external device, for example as a charging station or the like.

What is claimed is:

1. A method for operating a charging device of an electrical energy store for a motor vehicle, wherein a dedicated rectifier device for generating a charging voltage for the electrical energy store is associated with each phase of an AC power supply, the method comprising:

determining for each rectifier device a usage variable descriptive of its prior usage for charging the electrical energy store, when performing a multi-phase charging operation with the charging device, using for each phase a corresponding rectifier device for generating the charging voltage for the electrical energy store, when performing a single-phase charging operation with the charging device, using the hitherto most underused rectifier device for generating the charging voltage for the electrical energy store based on the usage variable, and determining a utilization factor indicative of an operating time of the rectifier device or prior work hitherto performed by each rectifier device, wherein in a charging device designed for a three-phase charging, two most underused rectifier devices based on the utilization factor are used for a charging process during a two-phase charging.

2. The method of claim 1, comprising:

connecting a first rectifier device connected for single-phase charging to a first connecting cable and a switching device for selectively connecting to the first connecting cable at least one second rectifier device that is different from the first rectifier device, closing at a start of each charging process a switch of the switching device to thereby connect a least-used second rectifier device to the first connecting cable, and deactivating the first rectifier device.

3. The method of claim 2, wherein the switch comprises a relay or a semiconductor switch.

4. The method of claim 1, and further measuring a voltage at all connecting cables that connect the respective rectifiers to the AC power supply, in order to distinguish between single-phase charging and multi-phase charging.

5. A charging device for an energy store of a motor vehicle, comprising a respective rectifier device connected via a respective connecting cable with each phase of an AC power supply in one-to-one correspondence for generating a charging voltage for the energy store, wherein a first connecting cable connected to a first rectifier device is used in single-phase charging of the energy store, a respective counting device determining for each rectifier device a utilization factor indicating prior usage of the respective rectifier device, and a control device configured to use in a single-phase charging process the most underused rectifier device that has in accordance with contents of the counting devices the hitherto lowest utilization factor, wherein in a charging device designed for a three-phase charging, two most underused rectifier devices based on a utilization factor are used for a charging process during a two-phase charging.

6. The charging device of claim 5, further comprising a switching device controllable by the control device and configured to selectively connect to the first connecting cable a second rectifier device different from the first rectifier device.

7. The charging device of claim 6, wherein at least one switch of the switching device is constructed as a relay or a semiconductor switch.

8. The charging device of claim 5, further comprising a voltage measuring device associated with each connecting cable for transmitting measurement data to the control device.

* * * * *